(12) United States Patent
Miller, Jr. et al.

(10) Patent No.: US 6,370,018 B1
(45) Date of Patent: Apr. 9, 2002

(54) PORTABLE COMPUTER KEYBOARD

(76) Inventors: William B. Miller, Jr.; William S. Miller, both of 1056 Brookwood Dr., Mechanicsburg, PA (US) 17055

( * ) Notice: Subject to any disclaimer, the term of this patent is extended or adjusted under 35 U.S.C. 154(b) by 0 days.

(21) Appl. No.: 09/641,672

(22) Filed: Aug. 18, 2000

(51) Int. Cl.$^7$ .................................................. G06F 1/16
(52) U.S. Cl. .................... 361/680; 364/708.1; 345/169; 379/258
(58) Field of Search ................................ 361/680–683; 364/708.1; 400/682, 82; 345/168, 169; 341/22; D14/341; 379/368, 258

(56) References Cited

U.S. PATENT DOCUMENTS

| | | | |
|---|---|---|---|
| 4,324,976 A | 4/1982 | Lapeyre ................... 235/145 R |
| 4,517,660 A | 5/1985 | Fushimoto et al. .......... 364/708 |
| 4,885,430 A | 12/1989 | Kinser, Jr. et al. ........... 174/254 |
| 4,939,514 A | 7/1990 | Miyazaki ..................... 341/22 |
| 5,278,779 A | 1/1994 | Conway et al. ........... 364/708.1 |
| 5,410,333 A | 4/1995 | Conway ...................... 345/169 |
| 5,481,263 A | 1/1996 | Choi ............................. 341/20 |
| 5,745,056 A | 4/1998 | Takahashi et al. ............. 341/22 |
| 5,874,906 A | 2/1999 | Willner et al. ................. 341/22 |
| 5,941,648 A | 8/1999 | Robinson et al. ............. 400/82 |
| 6,057,788 A | 5/2000 | Cummings .................... 341/22 |
| 6,108,200 A * | 8/2000 | Fullerton ..................... 361/686 |
| 6,288,708 B1 * | 9/2001 | Stringer ....................... 345/169 |

OTHER PUBLICATIONS

"Two Sided Keyboard for Data Terminal," IBM Technical Disclosure Bulletin, vol. 24, No. 1B, Jun. 1981, p. 714.
Seth Lubove, "Is That a Qwerty in Your Pocket?," FORBES magazine, May 15, 2000 issue, p. 342.
John Fried, "The Dynamic Duo," Worth magazine, Jun. 2000 issue, pp. 38–39.

* cited by examiner

Primary Examiner—Leo P. Picard
Assistant Examiner—Hung Van Duong
(74) Attorney, Agent, or Firm—Thomas Hooker, P.C.

(57) ABSTRACT

A portable keyboard enables touch typing with both hands without external support. The keyboard includes a first array of keys and a second array of keys on opposite sides of the keyboard. The keyboard is held between the hands and is supported against the palm of one hand for touch typing with both hands.

17 Claims, 9 Drawing Sheets

PORTABLE COMPUTER KEYBOARD

FIELD OF THE INVENTION

The invention relates to a portable keyboard, and particularly to a portable keyboard that enables touch typing with both hands.

BACKGROUND OF THE INVENTION

Handheld computers and other handheld electronic devices are becoming increasingly popular. These devices are held in the palm of the hand and typically run applications that store calendar and contact information, access the Internet or wireless telephone systems, or do word processing and the like. Such applications require the entry of numbers and text into the device.

Handheld electronic devices typically include a small keyboard for entering numbers and text. The keyboard has miniaturized keys laid out in a standard QWERTY arrangement. "QWERTY" refers to the most commonly used arrangement of keys on a keyboard and is named after the arrangement of letters in the left-hand corner of the keyboard. Because of their small size, the keys require "hunt and peck" typing with a single finger or a stylus. In either case, touch typing is impossible and data input is slow and tedious.

Some handheld devices include keyboards which eliminate keys to reduce size. Such keyboards require a "chording" system wherein two or more keys must be simultaneously pressed to generate keystrokes for the eliminated keys. Chording systems also do not enable touch typing and data input is slow.

Folding keyboards for handheld devices are also known. These keyboards open to form a full-sized keyboard similar to conventional keyboards used with desktop computers. Although these keyboards do allow touch typing, the keyboard must be supported on a flat work surface or table during use.

Thus, there is a need for an improved portable keyboard for use with handheld electronic devices. The improved keyboard should enable touch typing for the quick and efficient input of data, be compact, and should be usable without the need for additional external support during use.

SUMMARY OF THE INVENTION

The present invention is directed to an improved keyboard for use with handheld electronic devices. The improved keyboard is compact, enables touch typing for the quick and efficient input of data, and is usable without the need for additional external support during use.

A keyboard having features of the present invention includes a left-hand keypad having a first array of keys on one side of the keyboard and a right-hand keypad having a second array of keys on the opposite side of the keyboard. The array of keys on the left-hand keypad includes left-hand QWERTY keys and the array of keys on the right-hand keypad includes right-hand QWERTY keys. Both arrays of keys are configured to enable touch typing with the hand associated with the keypad. The keyboard is held in the palm of the hand with the fingers of that hand facing the keys of the keypad associated for touch typing on that keypad. The other hand touch types on the other keypad. The hands substantially oppose one another and type on opposite sides of the keyboard with the keyboard held between them.

In preferred embodiments of the present invention the right-hand keypad is held in the palm of the left hand and includes a body that supports the keyboard against the palm and left forearm. The fingers on the left hand overlie the keys on the left-hand keypad. The keys on the right-hand keypad face upwardly away from the palm for typing with the right hand. The left and right keypads are movable relative each other to adjustably place the left and right hands of the typist in a comfortable cross-handed touch typing position. The right-hand keypad may also duplicate the keys on the left-hand keypad to enable "hunt-and-peck" typing of all characters with the right hand.

In another such embodiment, the right-hand keypad includes a foldable keypad extension. The keypad extension can include a mouse attachment portion for attaching a portable mouse as a pointing device or the keyboard itself can include a mouse pointing device such as a touch-sensitive mouse panel.

In yet another such embodiment the right-hand keypad includes foldable keypad portions that preferably extend along the forearm when opened. When closed, the keypad portions overlie one another. The outermost keyboard portion includes an array of keys that face outwardly when the keyboard is closed. The keyboard can form part of a wireless telephone, with the outermost keyboard portion including the keys found on a conventional telephone numeric keypad and the other keypad portions including letter keys. When the right-hand keypad is closed, the numeric keypad is accessible for dialing the phone. For text input, as when accessing the Internet, the right-hand keyboard is opened and the entire right-hand keypad is accessible for touch typing with the right hand.

Other objects and features of the invention will become apparent as the description proceeds, especially when taken in conjunction with the accompanying drawings illustrating the invention, of which there are eight sheets of seven embodiments.

DESCRIPTION OF THE PREFERRED EMBODIMENTS

FIGS. 1–4 illustrate a first embodiment portable keyboard 10 for a portable handheld computer in accordance with the present invention. The keyboard 10 has upper and lower sides 12, 14 respectively joined by opposing edges 15 and extends longitudinally between forward and rear keyboard ends 16, 18 respectively. A left-hand keypad 20 configured for touch typing with the left hand is on the lower side 14 of the keyboard at the forward end of the keyboard. A right-hand keypad 22 configured for touch typing with the right hand is on the upper side 12 of the keyboard and extends from the left-hand keypad 20 to the rear end 18 of the keyboard.

A keyboard body 24 interconnects the keypads and includes a forward body portion 26 and a rear body portion 28 interconnected by a connection 30. A conventional flexible cable (not shown) electrically interconnects the two keypads 20, 22 and extends through connection 30. The left-hand keypad 20 is mounted on the lower side of forward body portion 26 and the right-hand keypad 22 is mounted on the upper side of rear body portion 28. The rear body portion 28 supports the keyboard 10 in an operative position in the left hand of a user as will be explained in greater detail below. A palm rest 32, wrist strap 34 and arm rest 36 are attached to the rear body portion 28 and assist in supporting the keyboard 10 in the operative position.

The connection 30 enables the front and rear body portions 26, 28 to be movable with respect to each other. The front body portion 26 can move from a stowed position immediately adjacent the rear body portion 28 as shown in solid lines in FIG. 1 to a typing position away from the rear body portion 28 as shown in the phantom lines. The connection 30 includes an elongate slide member 38 that carries the forward body portion 26 and is slideably mounted in a slot 40 formed in the rear body portion 28. The forward body portion 26 is pivotally mounted on the end of the slide member 38 for pivoting about a transverse axis to the typing position shown in FIG. 1.

Figure 4:
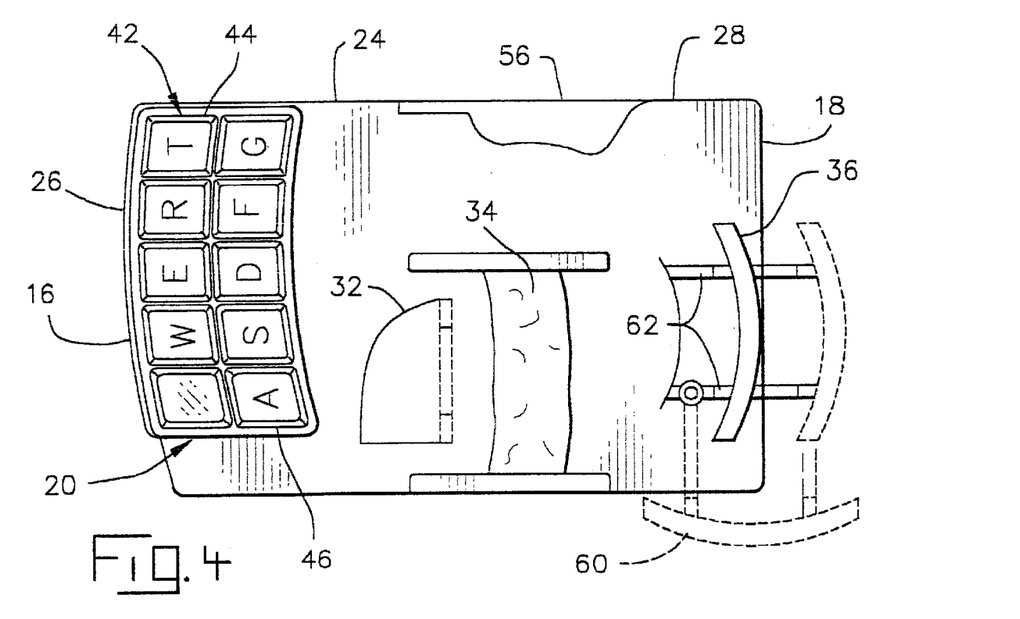
FIG. 4 is a bottom view of the keyboard shown in FIG. 1.

The left-hand keypad 20 has a first array of keys 42 located on the lower side of the forward body portion 26. In this embodiment the first array of keys 42 includes some, but not all, of the conventional left-hand QWERTY keys. The keys 42 are preferably arranged in two curved rows 44 and 46. The first row 44 includes the conventional left-hand QWERTY keys T, R, E and W and the second row 44 includes the conventional left-hand QWERTY home-row keys G, F, D, S and A. FIG. 4 illustrates one possible arrangement of the keyboard keys 42. In other possible embodiments, additional left-hand QWERTY keys can be included. The keys 42 essentially lie in a common plane, and the connection 30 enables rotation of the plane for adjustment of the typing position.

Figure 1:
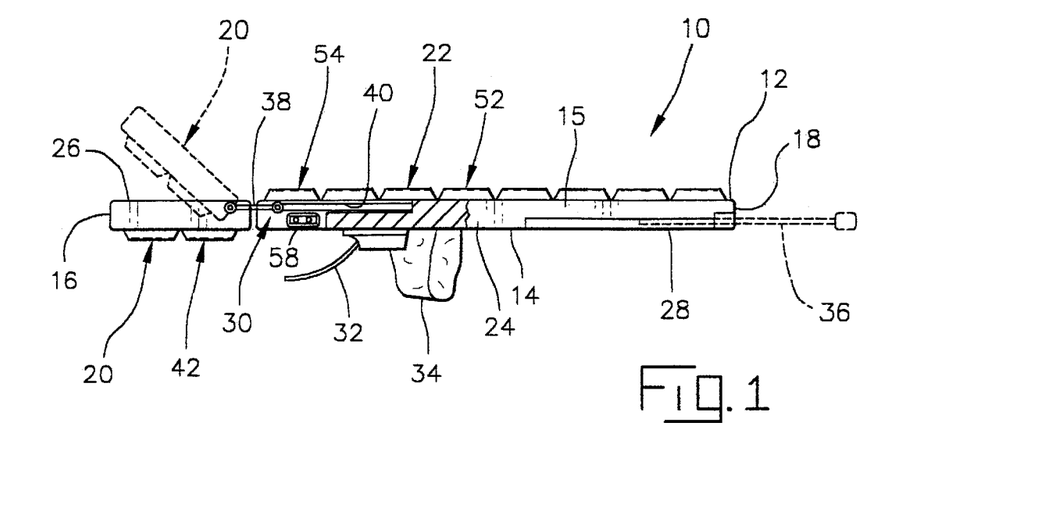
FIG. 1 is a side view of a first embodiment keyboard of the present invention and includes a partial sectional view of the connection between the front and rear body portions of the keyboard and the keyboard jack.
Figure 2:
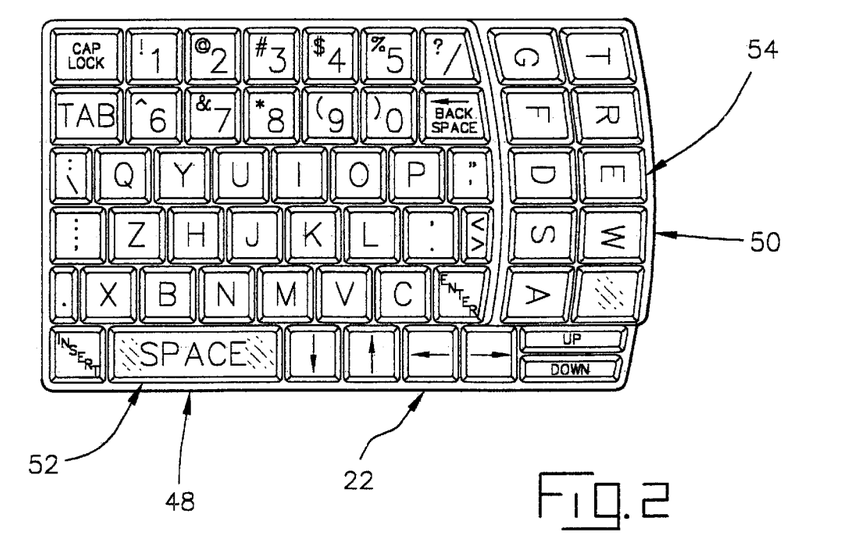
FIG. 2 is a top view of the right-hand keypad of the keyboard shown in FIG. 1.
Figure 3:
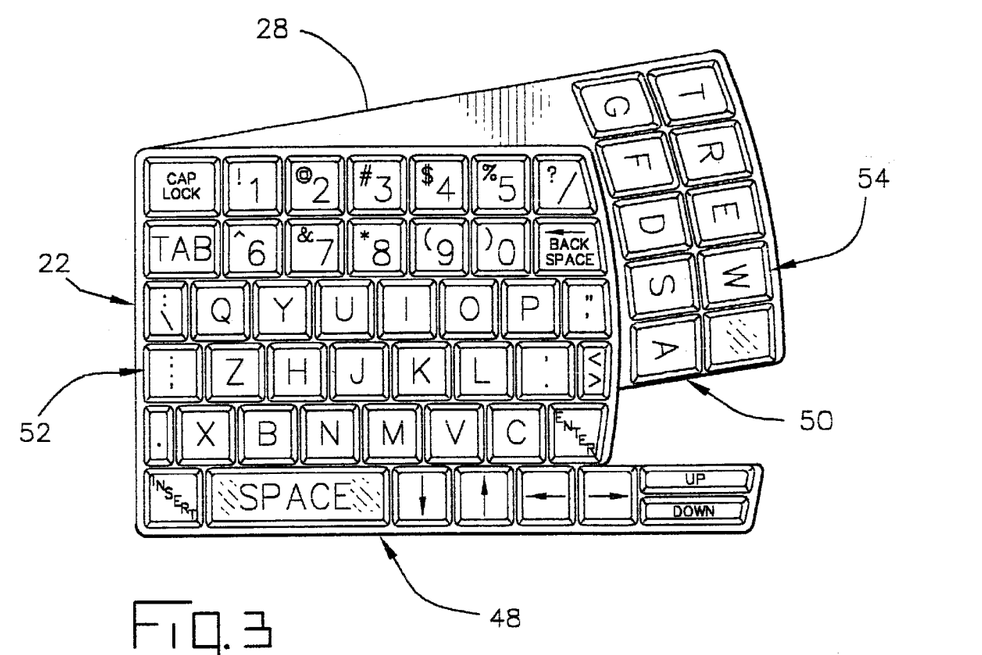
FIG. 3 is similar to FIG. 2 but with the movable portion of the right-hand keypad rotated to a typing position.

The right-hand keypad 22 includes a movable keypad portion 48 and a stationary keypad portion 50. The movable keypad portion 48 is pivotally mounted on the rear body portion 28 and the stationary keypad portion 50 is fixedly mounted on the body portion 28. The two keypad portions 48, 50 are essentially coplanar, although in other embodiments one keypad portion 48 or 50 could be raised or lowered with respect to the other. The movable keypad portion 48 includes a second array of keys 52 which include the conventional right-hand QWERTY keys and any left-hand QWERTY keys not included in the first array of keys 42. In this embodiment the second array of keys 52 also includes a Space key, conventional number keys, punctuation keys, navigation keys, and the like.

FIG. 2 illustrates one possible arrangement of the second array of keys 52. The keys 52 preferably lie essentially in a common plane and are arranged in a number of parallel rows. The conventional right-hand QWERTY number and letter keys (Y, H, N, 6, 7, 8, etc.) form a block of right-hand letters in the standard QWERTY arrangement. The left-hand QWERTY letter keys not included on the left-hand keypad are located at the ends of the rows of the right-hand QWERTY letter keys. The left-hand QWERTY number keys are located in a row above the right-hand QWERTY number keys. The keys 52 are preferably identically sized and spaced as the keys of a conventional full-size keyboard for ease of touch typing. However, in other embodiments the size or spacing of the keys can be reduced if desired but should still enable touch typing.

The stationary keypad portion 50 is adjacent the forward body portion 26 and includes a third array of keys 54. The third array of keys 54 duplicates the left-hand QWERTY keys 42 of the left-hand keypad 20 and are arranged in a corresponding manner. In this way the right-hand keypad 22 includes all of the left-hand and right-hand QWERTY keys. In other embodiments the stationary keypad portion 50 may be omitted and the duplicated keys of the left-hand keypad can be included on the movable keypad portion 48. In yet other embodiments the stationary keypad portion 50 could include other keys or other arrangements of keys as desired.

An additional key 56 is located on one edge of the rear body portion 28. The key 56 is positioned between the upper and lower sides of the keyboard 10 for keypresses by the left thumb. In this embodiment the additional key 56 is a Shift key, but can be a different key in other embodiments.

A conventional keyboard cord jack 58 is located on the other edge of the rear body portion 28 to interconnect the keyboard 10 with a computer or other electronic device (not shown) via a conventional keyboard cable. In other possible embodiments the keyboard jack can be replaced by other keyboard connectors, including an infrared or wireless keyboard connector. Other jacks or ports, for example USB ports, could also be included.

The movable keypad portion 48 is pivotally mounted on the rear body portion 28 for limited rotation about an axis of rotation perpendicular to the plane of the keys 52. The keypad portion 48 can rotate clockwise in the plane of the keys from a stowed position shown in FIG. 2 to a typing position shown in FIG. 3. When the keypad portion 48 is rotated to the typing position, the rows of keys of the left-hand keypad 20 and the keypad portion 48 are angularly offset. Stops (not shown) limit the rotation of the keypad portion 48 on the rear body portion 28.

The palm rest 32, wrist strap 34 and arm rest 36 are attached to the lower side of the rear body portion 26. See FIG. 4. The palm rest 32 is pivotally attached to the body portion 28 and can pivot from a stored position adjacent the body portion 28 to an extended position shown in FIG. 1 for supporting the rear keyboard portion 28 against the palm of the hand. The wrist strap 34 is attached to the body portion 28 by hook-and-loop fasteners to enable adjustment about the left hand or wrist of the user. In other embodiments, other fasteners or adjustment devices can be used. The arm rest 36 is located at the rear of the rear body portion 28 and can extend from a retracted position beneath the body portion 28 as shown in solid lines in FIG. 4 to an extended position away from the body portion 28 as shown in phantom lines in FIGS. 1 and 4. The arm rest 36 includes a support member 60 pivotally attached to a slide member 62 that slideably mounts the slide member in the body portion 28. The support member 60 can pivot towards an edge of the body portion 28 for adjustment or to support the keyboard 10 against the abdomen of a user.

Figure 5:
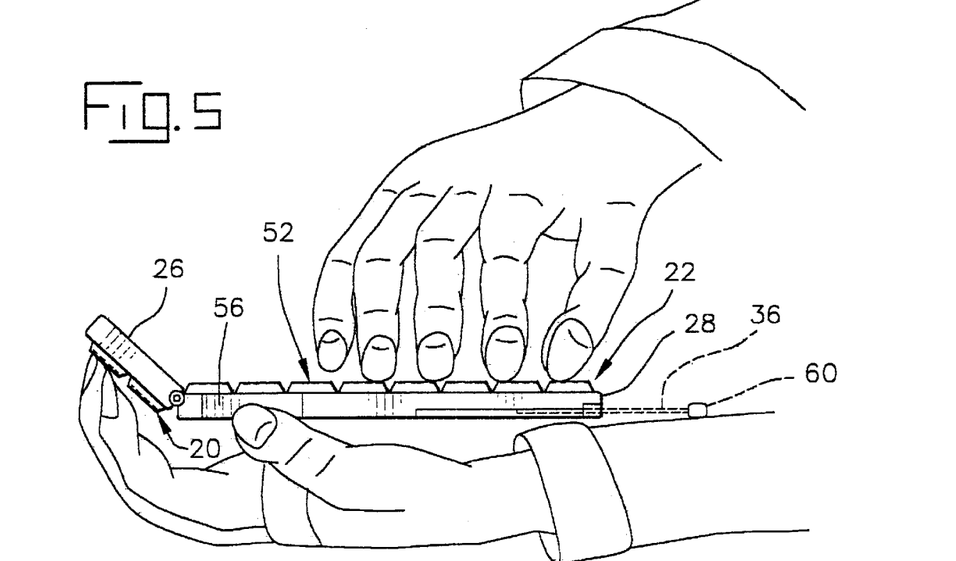
FIG. 5 is similar to FIG. 1 but shows a typist touch typing on the keyboard.

FIG. 5 illustrates a typist touch typing with both hands on the keyboard 10. A conventional keyboard cable (not shown) from a computer was previously inserted in the keyboard jack 58 to operatively connect the keyboard 10 with the computer (not shown). The typist holds the rear body portion 28 in the palm of his or her left hand. The upper side 12 of the keyboard 10 faces upwardly towards the user and away from the palm. The forward end of the keyboard 10 is near the tips of the left fingers and the rear end of the keyboard 10 is above the left forearm. The palm rest 32 and arm rest 36 are positioned as desired to comfortably support the keyboard 10 in the palm of the left hand and against the left forearm. The wrist strap 34 is placed over the left wrist for additional support. However, the keyboard is preferably balanced to remain in the palm of the typist without the need of the wrist trap.

As shown in FIG. 5, the typist has rotated the left-hand keypad 20 upwards to place the fingers of the left hand comfortably over the keys 42. The movable keypad portion 48 of the right-hand keypad 22 has been pivoted from its stowed position to an angularly offset position. This enables the left and right hands respect to assume a comfortable, cross-handed typing position.

The left hand is in its touch typing position with the left thumb on the Shift key 56 and the left fingers touch typing on the left-hand keypad 20. The size of the left-hand keypad keys 42 are preferably identical to the keys of a standard full-size keyboard, but the between-row spacing can be reduced from a conventional keyboard to accommodate the lesser finger excursion of the left hand when holding the keyboard 10. Further, in this embodiment, only one key on the left-hand keypad is for typing with the pinky finger because the pinky finger has the most limited finger excursion.

The typist has the right hand touch typing on the right-hand keypad portion 48. The left and right hands oppose each other in the cross-handed typing position described earlier. Although the keys 42 of the left-hand keypad 20 are normally obstructed from the view, a typist skilled in touch typing types without looking at the keys and can quickly adjust to touch typing with opposed left and right hands. The left-hand keys duplicated on the stationary keypad portion 50 also provides visual cuing that assists the typist in adjusting to typing on the left-hand keypad. The right-hand keypad portion 48 includes the few left-hand QWERTY keys not on the left-hand keypad 20. The typist will quickly adjust to typing such keys with the right hand.

The keyboard 10 can also be used by a "hunt-and-peck" typist who cannot touch type. The left-hand QWERTY keys duplicated on the stationary keypad portion 50 enables the full set of keyboard characters to be typed with one finger of the right hand. Because the stationary keypad portion 50 is intended for "hunt-and-peck" typing, it is not necessary that the keys 54 of the stationary keypad portion 50 be oriented or reachable for touch typing from the movable keypad portion 48.

Figure 6:
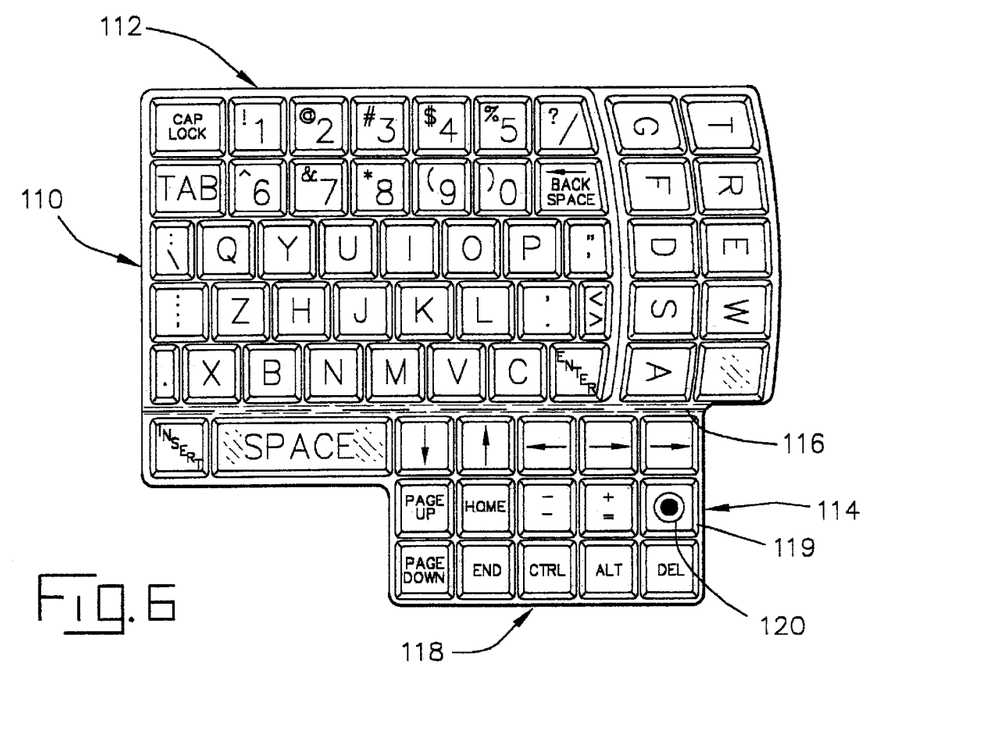
FIG. 6 is a view similar to FIG. 2 of a right-hand keypad of a second embodiment keyboard of the present invention.

FIG. 6 illustrates the right-hand keypad 110 of a second embodiment keyboard in accordance with the present invention. The keypad 110 is similar to the keypad 22 but the movable keypad portion 112 of the right-hand keypad 110 includes a foldable keypad extension 114 connected to the keypad portion 112 by a transverse hinge 116. The keypad extension 114 provides room for additional keys 118. The hinge 116 enables the keypad extension 114 to be folded over the keypad portion with the keys 118 on the extension facing the other keys on the keypad portion 112 for compact storage and to be folded open for use. In this embodiment the keypad extension keys 118 include the space key, control keys and navigation keys.

Figure 7:
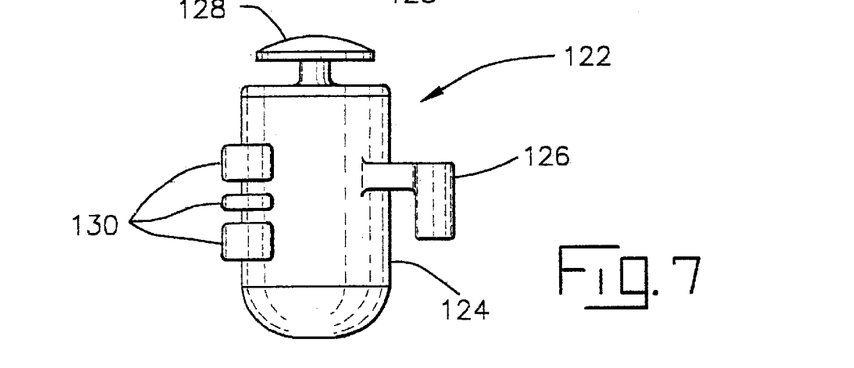
FIG. 7 is a side view of a portable mouse to be used with the keyboard shown in FIG. 6.
Figure 8:
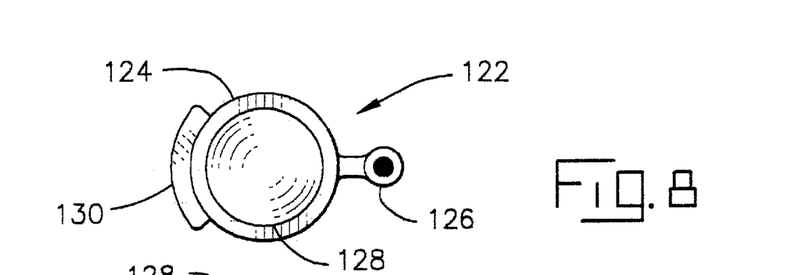
FIG. 8 is a top view of the mouse shown in FIG. 7.

A support 119 for a portable mouse is located at one side of the keypad extension 114 and includes a mounting hole 120. A portable mouse 122 for mounting on the mouse support 119, see FIGS. 7 and 8, includes a body 124 to be gripped in the palm of the right hand and a mounting post 126 extending from the body 124. The free end of the post 126 is received in the mounting hole 120 and supports the mouse 122 on the keypad extension 114. The body 124 is generally cylindrical and supports a thumb toggle 128 on the upper end of the body 124 for moving a cursor about the computer screen and conventional mouse buttons 130 on the outside of the body 124 for mouse clicks. The mouse 122 can be connected to the computer by a mouse cable (not shown) or wireless connection. In other embodiments the thumb toggle 128 could be replaced by a track-ball or other type of thumb-operated mouse pointing device.

Figure 9:
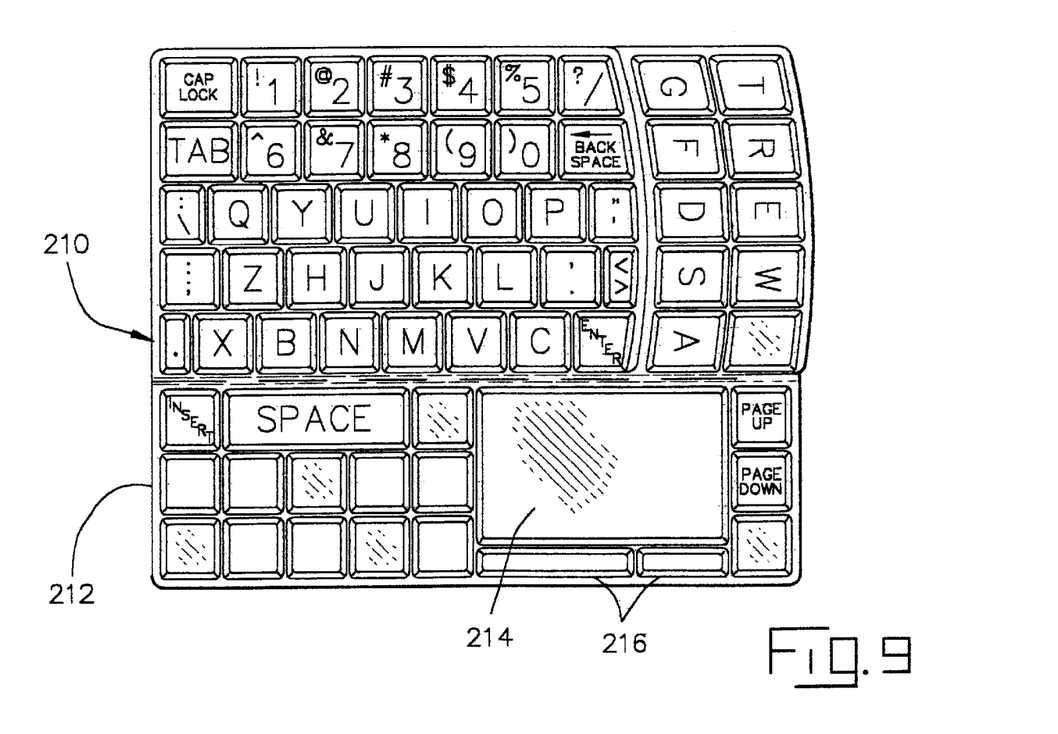
FIG. 9 is a view similar to FIG. 2 of a right-hand keypad of a third embodiment keyboard of the present invention.

FIG. 9 illustrates a third embodiment right-hand keypad 210 in accordance with the present invention. The keypad 210 is similar to keypad 110 but the folding keypad extension 212 does not include a mouse attachment. Instead, the keypad extension 212 includes a conventional touch-sensitive mouse panel 214 and mouse buttons 216. In other embodiments a conventional "pointing stick" type mouse control could be located between two keys of the right-hand keypad in a conventional manner and could replace or be used in addition to the mouse panel.

Figure 10:
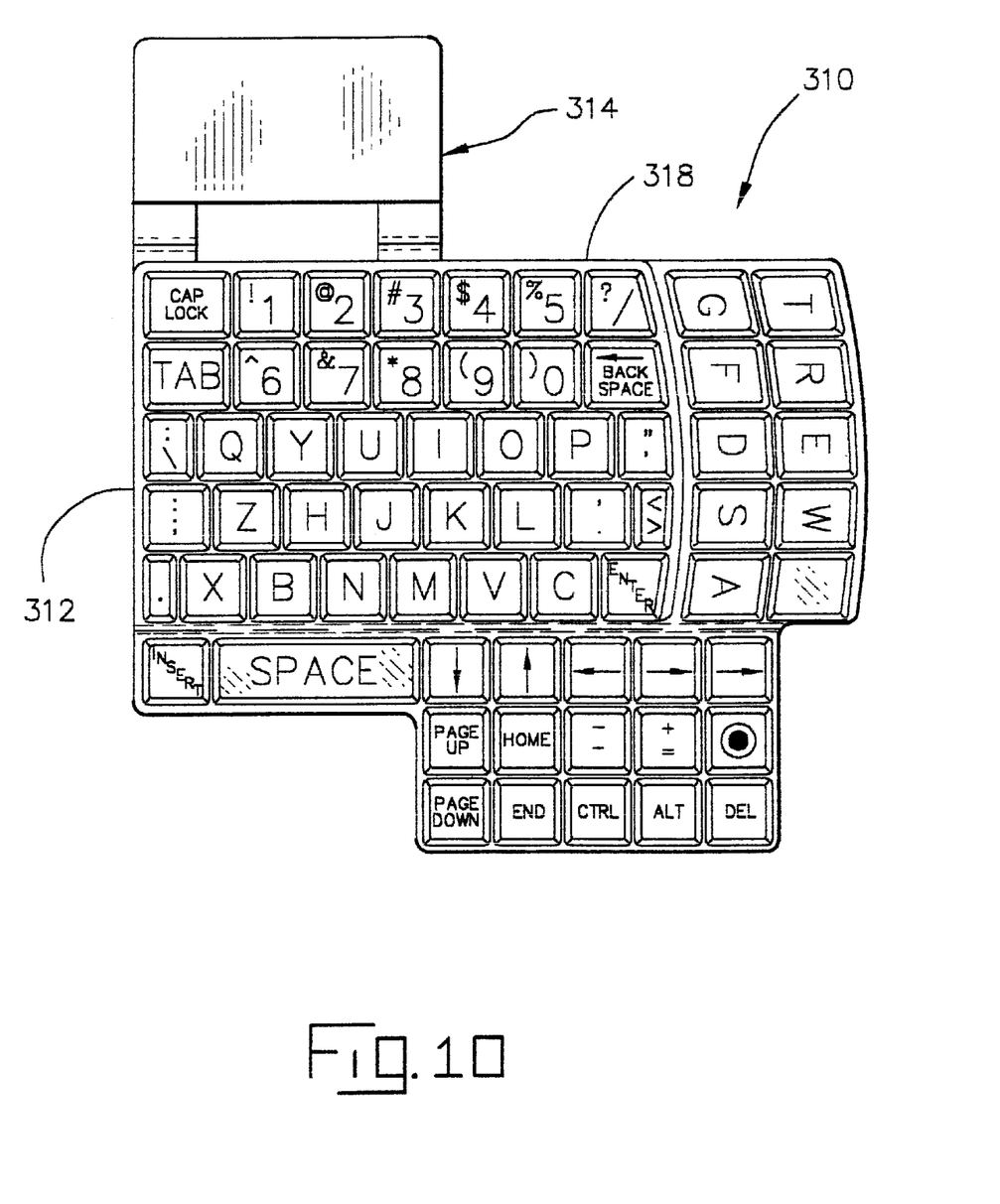
FIG. 10 is a view similar to FIG. 2 of a fourth embodiment keyboard of the present invention.

FIG. 10 illustrates a fourth embodiment keyboard 310 in accordance with the present invention. The right-hand keypad 312 of the keyboard 310 is similar to keypad 110. A docking bay 314 for removably docking a hand-held electronic device to the keyboard 310 is attached to an edge of the rear body portion 318. The docking bay 314 is conventional and operatively interconnects the keyboard and the electronic device. The docking bay 314 orients the hand-held device for convenient viewing of the device display during touch typing with the keyboard.

Figure 11:
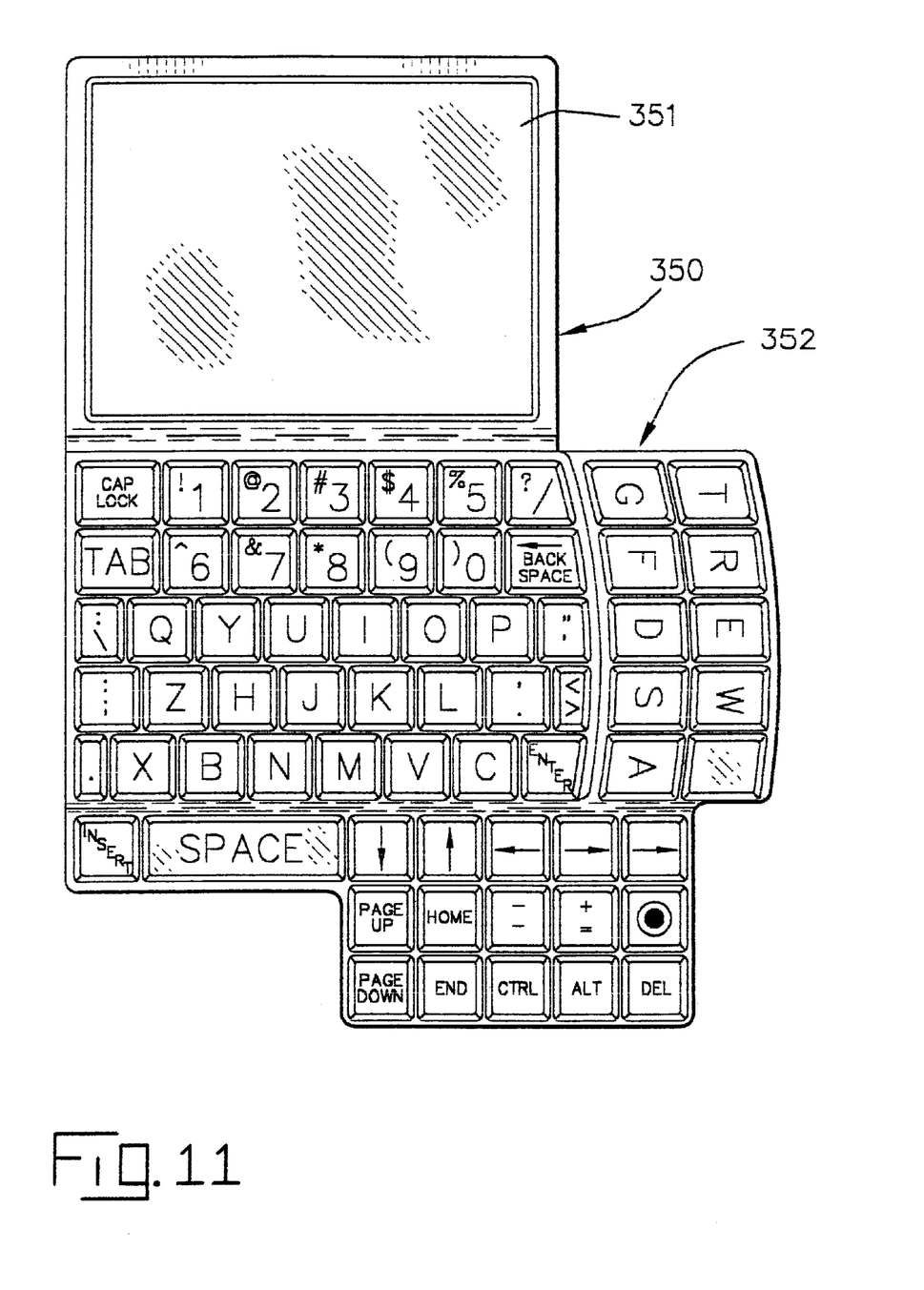
FIG. 11 is a view similar to FIG. 2 of a portable electronic device incorporating a fifth embodiment keyboard of the present invention.

In other possible embodiments the electronic device can be permanently attached to the keyboard. FIG. 11 illustrates a portable computer 350 having a display screen 351 and a fifth embodiment keyboard 352 similar to keyboard 310. Instead of a docking bay, the keyboard 352 is an integral part of the computer 350 to form a unitary device.

FIGS. 12–15 illustrates a wireless telephone 410 having a sixth embodiment keyboard 412 in accordance with the present invention. The telephone 410 includes a handheld unit or body 414 having a front or upper side 416, a back or lower side 418, a right edge 420 and a left edge 422. An antenna 426 extends from an upper end of the body. A display screen 428 is located on the upper side 416 of the body near the antenna. The keyboard 412 includes a right-hand keypad 430 and a left-hand keypad 432. The right-hand keypad 430 is mounted on the upper side 416 of the body adjacent the display screen 428. The left-hand keypad 432 is mounted on a auxiliary body 433 mounted to the lower side 418 of the body 414. A palm rest 434, similar to the palm rest 32 of the first embodiment keyboard 10, is attached to the lower side of the unit 414. A wrist strap 436, shown in dashed lines in FIG. 14, can also be attached to the unit 414.

Figure 14:
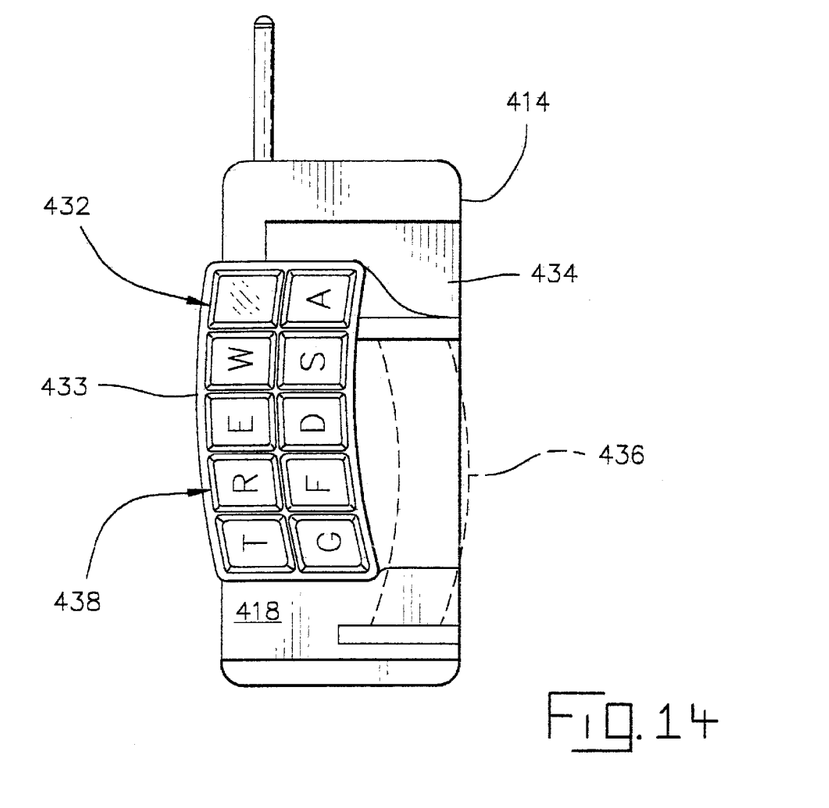
FIG. 14 is a back view of the wireless telephone shown in FIG. 13 with the left-hand keypad near its stowed position.
Figure 15:
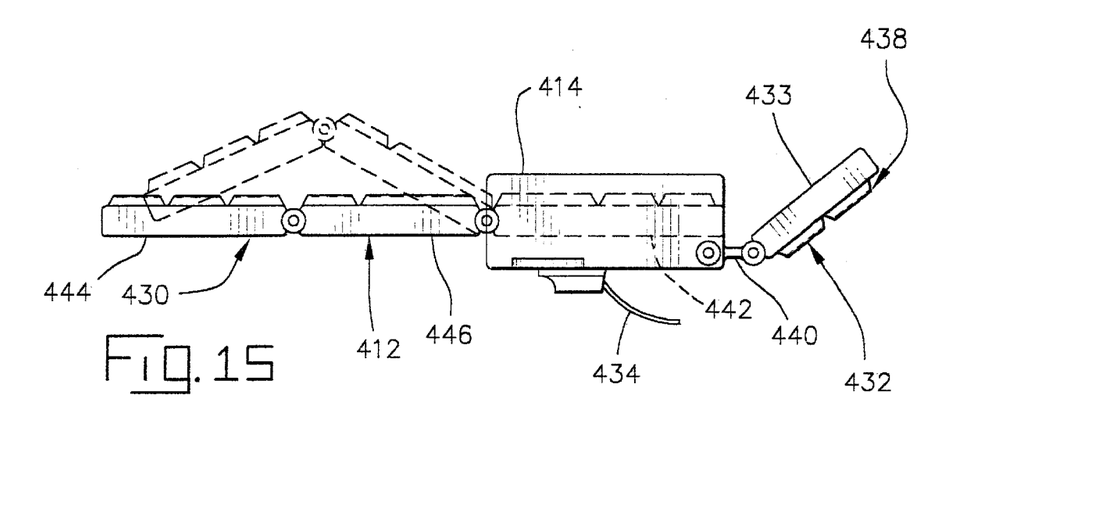
FIG. 15 is a bottom view of the wireless telephone with the keypads opened for touch typing.

The left-hand keypad 432 has an array of keys 438, like keys 42, facing away from the lower side of the unit 414 and includes two rows of left-hand QWERTY keys T, R, E, W and G, F, D, S, A. See FIG. 15. The auxiliary body 433 is movably connected to the hand-held unit 414 by a connection 440, similar to the connection 30 of keyboard 10. The connection 440 enables the left-hand keypad 432 to move from a stowed position below the unit as shown in FIG. 14 outwardly from the right edge of the unit to a typing position adjacent the unit as shown in FIG. 15.

Figures 12, 13:
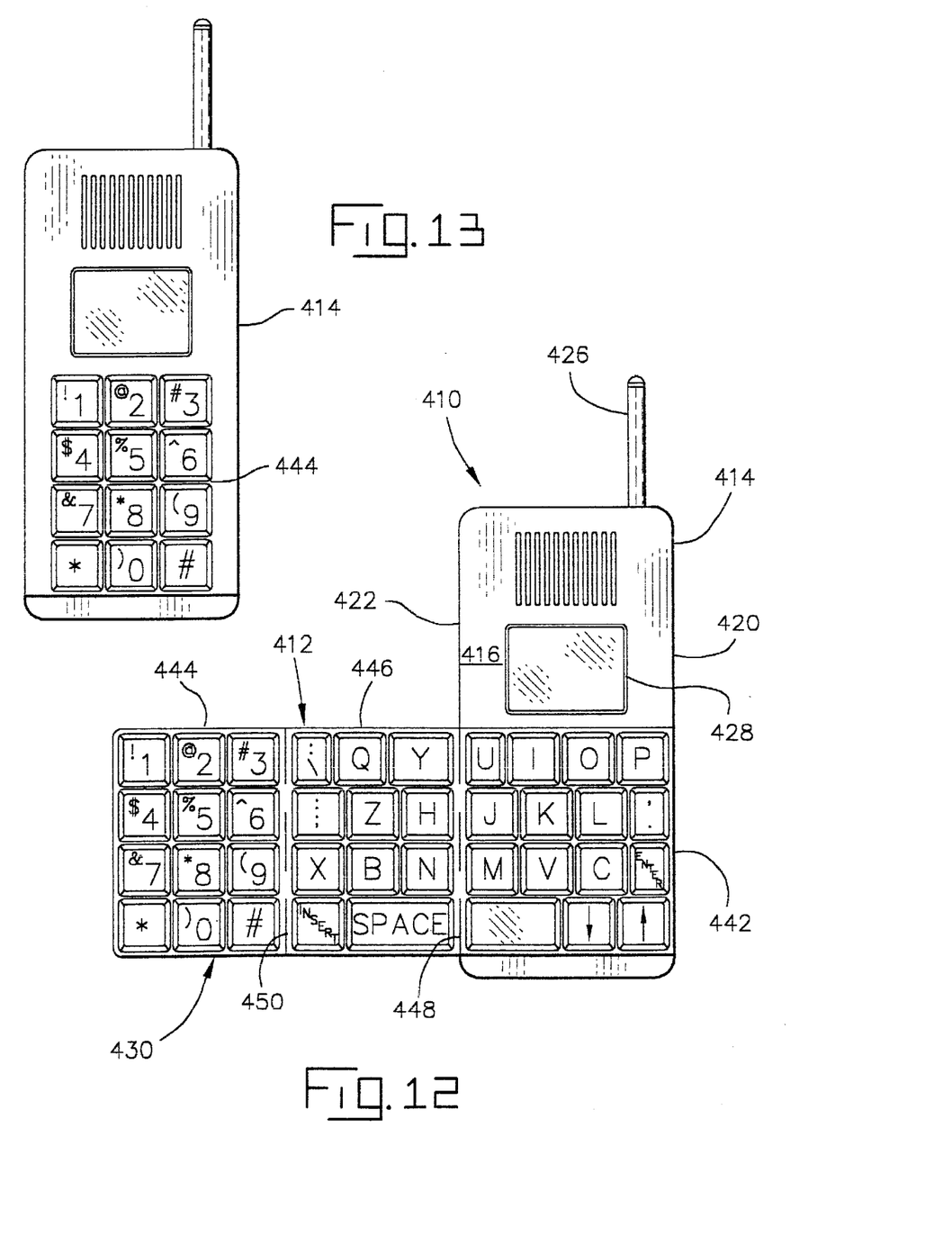
FIG. 12 is a front view of a wireless telephone incorporating a sixth embodiment keyboard of the present invention with the right-hand keypad in its opened position.
FIG. 13 is similar to FIG. 12 but with the keypad in its closed position.

The right-hand keypad 430 is a foldable keypad having a base portion 442 rigidly attached to the handheld unit 414, an end portion 444 and an intermediate portion 446 between the end and base portions. A first hinge 448 parallel with the left edge of the unit 414 foldably connects the adjacent sides of the base and intermediate keypad portions and a second hinge 450 parallel with hinge 448 foldably connects the adjacent sides of the end and intermediate portions. When unfolded, the keypad 430 preferably extends from the left edge of the unit 414 as shown in FIG. 12 and forms a flat keypad supported against the left forearm of the user. In this embodiment, the end keypad portion 444 includes the keys found on a conventional telephone numeric keypad (number keys 0–9, pound sign and star keys) and the other keypad portions 442, 446 include the right-hand QWERTY keys and the left-hand QWERTY keys not included on the left-hand keypad.

The hinges 448, 450 enable the right-hand keypad 430 to "Z" fold to a stowed position above the unit. See FIG. 13. The end and intermediate keypad portions 440 and 446 overlie the base portion 414, with the telephone keys on the end keypad portion 444 facing outwardly from the unit 414.

The telephone can be operated with both right and left keypads in their stowed positions. A user holds the body 414 in either hand and can press the accessible telephone keys on the end keypad portion 444 for dialing a telephone number or the like.

If entry of alphanumeric data is desired, the unit 414 is held in the palm of the left hand with the display 428 facing away from the palm. The palm rest 434 and wrist support 436 can be used if desired to support the telephone on the left palm or forearm. The left-hand keypad 432 is moved to its typing position with the fingers of the left hand facing the left-hand QWERTY keys. The right-hand keypad 430 is then unfolded from the left side 422 of the body 414 and is supported against the left forearm. The user then places his or her right hand over the unfolded right-hand keyboard portion 430. The user may then touch-type with both hands as described earlier for the first embodiment keyboard 10.

Figure 16:
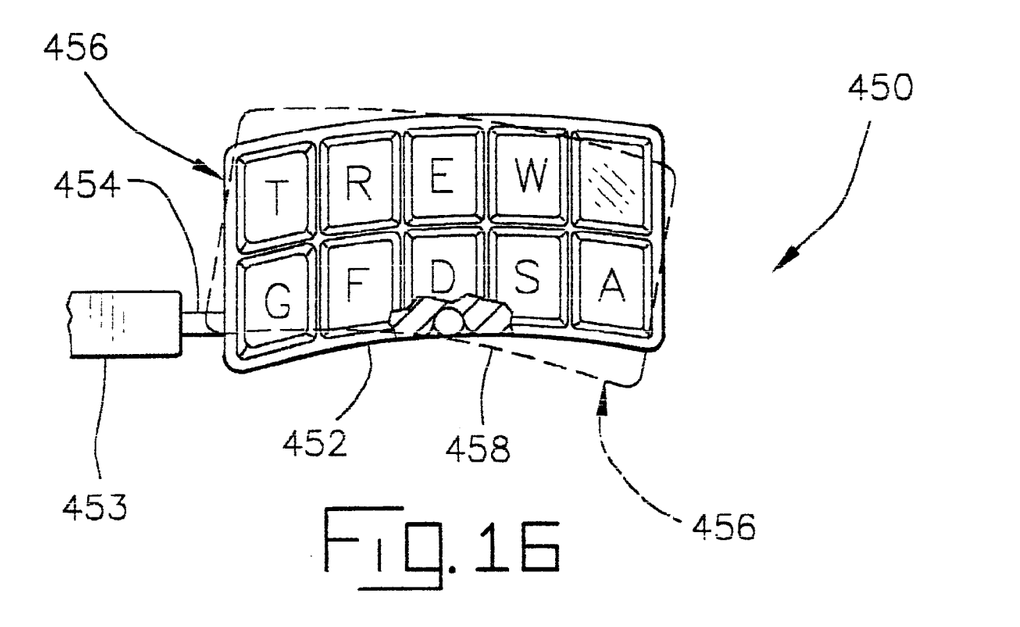
FIG. 16 is a partial sectional view of the bottom of a forward body portion of a seventh embodiment keyboard.

FIG. 16 illustrates a portion of a seventh embodiment keyboard 450 similar to keyboard 10. In this embodiment the left-hand keypad is pivotally mounted on the forward body portion for additional adjustment of the orientation of the keypad. A forward body portion 452 is connected to the rear body portion 453 by a connection 454 like connection 30. A left-hand keypad 456 is pivotally mounted on the forward body portion 452 for limited rotation about a stub axle 458. The stub axle 458 defines an axis of rotation perpendicular to the plane of the keys on the left-hand keypad. FIG. 16 shows the keypad 456 in dashed lines at one end of its range of motion. In other possible embodiments the entire forward body portion 452 can be pivotally mounted on the connection 454 to enable the same rotation of the keypad 456.

Although the embodiments shown are intended to be used with the keyboard supported by the left hand, in other embodiments of the present invention the keyboard can be designed to be supported by the right hand.

In yet other embodiments of the present invention other keyboard layouts or character sets of other languages can be used. The "QWERTY" keypad arrangement shown in the preferred embodiments is intended to be representative of known standardized touch typing conventions, and other known touch typing conventions (such as the Dvorak keyboard arrangement) can be substituted. The term "QWERTY" should be understood as a generic term for such standardized touch typing conventions.

Chording systems that require a combination of keys to be simultaneously pressed to generate a particular keystroke can also be used in other embodiments of the present invention.

While we have illustrated and described preferred embodiments of our invention, it is understood that these are capable of modification, and we therefore do not wish to be limited to the precise details set forth, but desire to avail ourselves of such changes and alterations as fall within the purview of the following claims.

What we claim as our invention is:

1. A portable keyboard which enables touch typing with both hands of a user without an external keyboard support, the keyboard comprising:

a body having a lower side and an upper side, the body being configured to be held in an operative position against a hand or forearm of a user with the lower side of the body facing the hand or forearm;

a lower keypad on the lower side of the body and an upper keypad on the upper side of the body;

one of the keypads comprising a plurality of right-hand QWERTY keys arranged for touch typing by the fingers of the right hand and the other keypad comprising a plurality of left-hand QWERTY keys arranged for touch typing by the fingers of the left hand;

whereby when the keyboard is held in the operative position the fingers of the one hand of a user can access the keys on the lower keypad and the fingers of the other hand of a user can access the keys on the upper keypad for touch typing with both hands.

2. The keyboard of claim 1 wherein the body comprises a connection movably interconnecting the upper and lower keypads for relative motion of one keypad with respect to the other keypad.

3. The keyboard of claim 1 wherein at least one of the keypads defines a plane and is pivotally mounted to the body for rotation about an axis transverse to the plane.

4. The keyboard of claim 1 wherein the upper keypad comprises an additional plurality of QWERTY keys duplicating the plurality of QWERTY keys of the lower keypad.

5. The keyboard of claim 1 wherein the upper keypad comprises first and second keypad portions and a first foldable connection joining the first and second keypad portions;

whereby the upper keypad can be opened from a closed position wherein the keyboard portions overly each other to an opened position wherein the first foldable connection is between the keyboard portions.

6. The keyboard of claim 1 wherein the body includes a docking bay for mounting a portable electronic device.

7. The keyboard of claim 1 including a support for removably attaching a mouse.

8. The keyboard of claim 1 wherein the upper keypad includes a mouse pad for mouse inputs from the keyboard.

9. An electronic device comprising the keyboard of claim 1.

10. The keyboard of claim 2 wherein the connection defines an axis and pivotally mounts the lower keypad for pivoting about the axis.

11. The keyboard of claim 2 wherein the body comprises first and second body portions, the lower keypad on the first body portion and the upper keypad on the second body portion, the connection extending between the body portions.

12. The keyboard of claim 6 wherein the additional plurality of QWERTY keys are configured to provide visual cuing of the plurality of QWERTY keys on the lower keypad.

13. The keyboard of claim 8 wherein the upper keypad comprises a third keypad section and a second foldable connection joining the second and third keyboard sections;

whereby the upper keypad can be opened from the closed position wherein the third keypad portion overlies the first and second keypad portions to the closed position wherein the second foldable connection is between the second and third keypad portions.

14. The keyboard of claim 9 wherein the third keypad portion faces away from the body when the upper keypad is closed to be accessible for typing and includes keys for typing the numbers 0–9.

15. A portable electronic device comprising:
    a handheld unit configured to be held in a hand, the unit having front and back sides;
    a display on the front side of the unit;
    a front keypad on the front side of the unit;
    a back keypad on the back of the unit;
    one of the keypads comprising a plurality of right-hand QWERTY keys arranged for touch typing by the fingers of the right hand and the other keypad comprising a plurality of left-hand QWERTY keys arranged for touch typing by the fingers of the left hand;
    whereby when the keyboard is in the operative position the fingers of the one hand of a user can access the keys on the lower keypad and the fingers of the other hand of a user can access the keys on the upper keypad for touch typing with both hands.

16. The portable electronic device of claim 15 wherein the device is a computer.

17. The portable electronic device of claim 15 wherein the device is a telephone.

* * * * *